United States Patent
Paduano et al.

(10) Patent No.: US 11,029,157 B2
(45) Date of Patent: *Jun. 8, 2021

(54) AUTONOMOUS VEHICLE NAVIGATION SYSTEM AND METHOD

(71) Applicant: Aurora Flight Sciences Corporation, Manassas, VA (US)

(72) Inventors: James Paduano, Boston, MA (US); Terrence McKenna, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/815,245

(22) Filed: Nov. 16, 2017

(65) Prior Publication Data
US 2018/0073876 A1      Mar. 15, 2018

Related U.S. Application Data

(63) Continuation of application No. 15/388,482, filed on Dec. 22, 2016, now Pat. No. 9,880,006, which is a (Continued)

(51) Int. Cl.
*G01S 15/02*      (2006.01)
*G01S 15/93*      (2020.01)
(Continued)

(52) U.S. Cl.
CPC .......... *G01C 21/20* (2013.01); *G01C 21/165* (2013.01); *G01C 23/00* (2013.01);
(Continued)

(58) Field of Classification Search
CPC ...... G01C 21/20; G01C 23/00; G01C 21/165; G08G 9/02; G05D 1/101; G01S 15/89;
(Continued)

(56) References Cited

U.S. PATENT DOCUMENTS

| | | |
|---|---|---|
| 5,920,276 A | 7/1999 | Frederick |
| 6,064,924 A | 5/2000 | Fleischmann |

(Continued)

FOREIGN PATENT DOCUMENTS

| | | |
|---|---|---|
| EP | 1340999 | 9/2003 |
| EP | 2042963 | 4/2009 |

(Continued)

OTHER PUBLICATIONS

Machine Translation JP 2009-301146 (Year: 2009).*

(Continued)

*Primary Examiner* — Anne Marie Antonucci
(74) *Attorney, Agent, or Firm* — Michael Stanley Tomsa; McAndrews, Held & Malloy, Ltd.; Eugene H. Nahm

(57) ABSTRACT

An autonomous vehicle is improved with a navigational system having both cameras and echolocation sensors. The cameras and echolocation sensors may be part of an optical and echolocation system, respectively, that may work in conjunction with, for example, a global positioning system to determine a course for the autonomous vehicle to reach an objective while detecting and avoid obstacles along the course.

27 Claims, 6 Drawing Sheets

Related U.S. Application Data continuation of application No. 14/657,160, filed on Mar. 13, 2015, now Pat. No. 9,562,773.

(60) Provisional application No. 61/953,787, filed on Mar. 15, 2014.

(51) Int. Cl.

| | | |
|---|---|---|
| G01C 21/20 | (2006.01) | |
| G08G 9/02 | (2006.01) | |
| G01S 19/13 | (2010.01) | |
| G05D 1/10 | (2006.01) | |
| G01S 7/52 | (2006.01) | |
| G01S 15/42 | (2006.01) | |
| G01S 15/87 | (2006.01) | |
| G01S 15/89 | (2006.01) | |
| G01C 23/00 | (2006.01) | |
| G01C 21/16 | (2006.01) | |
| G01S 15/86 | (2020.01) | |

(52) U.S. Cl.
CPC .......... *G01S 7/52003* (2013.01); *G01S 15/42* (2013.01); *G01S 15/86* (2020.01); *G01S 15/87* (2013.01); *G01S 15/89* (2013.01); *G01S 15/93* (2013.01); *G01S 19/13* (2013.01); *G05D 1/106* (2019.05); *G08G 9/02* (2013.01)

(58) Field of Classification Search
CPC ...... G01S 15/87; G01S 15/42; G01S 7/52003; G01S 15/025; G01S 15/93; G01S 19/13
See application file for complete search history.

(56) References Cited

U.S. PATENT DOCUMENTS

| | | | |
|---|---|---|---|
| 6,268,803 | B1 | 7/2001 | Gunderson et al. |
| 6,670,910 | B2 | 12/2003 | Delcheccolo et al. |
| 6,678,210 | B2 | 1/2004 | Rowe |
| 6,975,246 | B1 | 12/2005 | Trudeau |
| 7,136,011 | B2 | 11/2006 | Mork et al. |
| 7,194,358 | B2 | 3/2007 | Callaghan et al. |
| 7,369,460 | B2 | 5/2008 | Chiappetta et al. |
| 7,443,154 | B1 | 10/2008 | Merewether et al. |
| 7,725,258 | B2 | 5/2010 | Smitherman |
| 7,751,976 | B2 | 7/2010 | Matuska et al. |
| 7,791,529 | B2 | 9/2010 | Filias et al. |
| 7,982,662 | B2 | 7/2011 | Shaffer |
| 8,467,953 | B2 | 6/2013 | Naderhirn |
| 8,500,067 | B2 | 8/2013 | Woodworth et al. |
| 8,543,265 | B2 | 9/2013 | Ekhaguere et al. |
| 8,970,401 | B2 | 3/2015 | Molander et al. |
| 9,557,742 | B2 | 1/2017 | Paduano et al. |
| 2003/0043058 | A1 | 3/2003 | Jamieson |
| 2005/0004723 | A1 | 1/2005 | Duggan et al. |
| 2005/0030378 | A1* | 2/2005 | Stiller .................. H04N 13/239 348/148 |
| 2005/0109872 | A1 | 5/2005 | Voos et al. |
| 2005/0271221 | A1 | 12/2005 | Cerwin |
| 2007/0046448 | A1 | 3/2007 | Smitherman |
| 2007/0195646 | A1 | 8/2007 | Govindswamy et al. |
| 2007/0210953 | A1 | 9/2007 | Abraham et al. |
| 2008/0027591 | A1 | 1/2008 | Lenser et al. |
| 2008/0125920 | A1 | 5/2008 | Miles et al. |
| 2008/0269966 | A1 | 10/2008 | Markiton et al. |
| 2009/0164122 | A1 | 6/2009 | Morbey et al. |
| 2009/0201763 | A1 | 8/2009 | Jones et al. |
| 2009/0306840 | A1 | 12/2009 | Blenkhorn et al. |
| 2010/0057278 | A1 | 3/2010 | Lee |
| 2010/0100269 | A1* | 4/2010 | Ekhaguere ............. G05D 1/101 701/26 |
| 2010/0228408 | A1 | 9/2010 | Ford et al. |
| 2010/0256909 | A1 | 10/2010 | Duggan et al. |
| 2010/0292871 | A1 | 11/2010 | Schultz et al. |
| 2011/0066307 | A1 | 3/2011 | Hiebl |
| 2011/0160941 | A1 | 6/2011 | Garrec et al. |
| 2011/0245996 | A1 | 10/2011 | Orsulak et al. |
| 2011/0307126 | A1 | 12/2011 | Hogstrom |
| 2012/0065881 | A1 | 3/2012 | McIver et al. |
| 2012/0130566 | A1 | 5/2012 | Anderson |
| 2012/0158222 | A1 | 6/2012 | Ehlin et al. |
| 2012/0199698 | A1 | 8/2012 | Thomasson et al. |
| 2012/0253582 | A1 | 10/2012 | Chrysanthakopoulos et al. |
| 2012/0293987 | A1 | 11/2012 | Espedal et al. |
| 2013/0001366 | A1 | 1/2013 | Wolff et al. |
| 2013/0110323 | A1* | 5/2013 | Knight ................... G08G 5/065 701/3 |
| 2013/0120164 | A1 | 5/2013 | Greene et al. |
| 2013/0151203 | A1 | 6/2013 | McEwen-King et al. |
| 2013/0325245 | A1 | 12/2013 | Kolcarek et al. |
| 2013/0332062 | A1 | 12/2013 | Kreitmair-Steck et al. |
| 2014/0012434 | A1 | 1/2014 | Spence et al. |

FOREIGN PATENT DOCUMENTS

| | | |
|---|---|---|
| EP | 2177966 | 4/2010 |
| EP | 2182419 | 5/2010 |
| EP | 2287633 | 2/2011 |
| EP | 2515147 | 10/2012 |
| JP | 2009-301146 | * 12/2009 |
| KR | 20100081759 | 7/2010 |
| WO | WO2007086055 | 8/2007 |
| WO | WO2010071505 | 6/2010 |
| WO | WO2014/064431 | 5/2014 |

OTHER PUBLICATIONS

David N. Lee, et al., Common principle of guidance by echolocation and vision, J Comp Physiol A (1992) 171:563-571.

F. Ruffier et al., Bio-Inspired Optical Flow Circuits for the Visual Guidance of Micro-Air Vehicles, IEEE 2003.

F. Ruffier, et al., Combining sound and optic flow cues to reach a sound source despite lateral obstacles, IEEE 2008.

Geoffrey Portelli, et al., A 3D Insect-Inspired Visual Autopilot for Corridor-Following, Proceedings of the 2nd Biennial IEEE/RAS-EMBS International Conference on Biomedical Robotics and Biomechatronics, Scottsdale, AZ, USA, Oct. 19-22, 2008.

G. Warwick, Bat-Inspired Tech to Aid Flight Along Streets, Aviation Week's DTI, Oct. 27, 2008.

Maryland Robotics Center, Horiuchi, Humbert Developing Bio-Inspired Navigation for Micro Air Vehicles, Oct. 29, 2008.

Liu, J., Xiao, Y., Hao, Q., and Ghaboosi, K., Bio-inspired Visual Attention in Agile Sensing for Target Detection, International Journal of Sensor Networks vol. 5, No. 2, Jan. 2009.

Frédéric L. Roubieu, et al., A novel 1-gram insect based device measuring visual motion along 5 optical directions, IEEE 2011.

Franck Ruffier, et al., A tiny directional sound sensor inspired by crickets designed for Micro-Air Vehicles, IEEE 2011.

Junliang Tao, et al., Bio-inspired Flow and Acoustic Sensor; Proc. of SPIE vol. 8019 80190R-1, 2011.

Jong Jin Park, et al., abstract of "Giant Acoustic Concentration by Extraordinary Transmission in Zero Mass Metamatrials," Phys. Rev. Lett. 110, 244302 (published Jun. 13, 2013).

Transmittal; International Search Report; and Written Opinion of the International Searching Authority for International Application No. PCT/US2015/030099 dated Aug. 17, 2015.

Chamberlain, L. et al., "Self-Aware Helicopters: Full-Scale Automated Landing and Obstacle Avoidance in Unmapped Environments," American Helicopter Society 67th Annual Forum Proceedings, Virginia Beach, Virginia, May 2011.

Office of Naval Research, Broad Agency Announcement No. 12-004.

Whalley, M. et al., "Field-Testing of a Helicopter UAV Obstacle Field Navigation and Landing System," American Helicopter Society 65th Annual Forum Proceedings, Ft. Worth, Texas, May 2009.

J. Paduano et al., "TALOS: An Unmanned Cargo Delivery System for Rotorcraft Landing to Unprepared Sites," American Helicopter Society 71st Annual Forum Proceedings, Virginia Beach, Virginia, May 2011.

(56) References Cited

OTHER PUBLICATIONS

"Autonomous Aerial Cargo/Utility System (AACUS): Concept of Operations (CONOPs)," The Office of Naval Research, Dec. 22, 2011.
R. Brockers et al., "Autonomous landing and ingress of micro-air-vehicles in urban environments based on monocular vision".
M. Verbandt et al., "Robust marker-tracking system for vision-based autonomous landing of VTOL UAVs," IMAV 2014.
S. Lange et al., "A Vision Based Onboard Approach for Landing and Position Control of an Autonomous Multirotor UAV in GPS-Denied Environments".
J. Paduano et al., "TALOS: An unmanned cargo delivery system for rotorcraft landing to unprepared sites," Jan. 2015.
IPR Petition PTAB-IPR2018-01704—dated Sep. 11, 2018.

\* cited by examiner

AUTONOMOUS VEHICLE NAVIGATION SYSTEM AND METHOD

CROSS-REFERENCE TO RELATED APPLICATIONS

This application is a continuation of and claims priority to U.S. application Ser. No. 15/388,482, filed on Dec. 22, 2016, which is a continuation of and claims priority to U.S. application Ser. No. 14/657,160, filed on Mar. 13, 2015, which claims priority to U.S. Provisional Patent Application No. 61/953,787, filed on Mar. 15, 2014, entitled "Autonomous Vehicle Navigation System and Method," by James Paduano, each of which are hereby incorporated by reference in their entireties.

FIELD OF THE INVENTION

This present invention generally relates to autonomous vehicle navigation and, more specifically, to techniques for detecting and automatically navigating around obstacles.

BACKGROUND

Unmanned aerial vehicle (UAV) technology has proven to be a valuable tool for mission profiles involving intelligence, surveillance, reconnaissance, and payload delivery. In contexts such as low-altitude urban reconnaissance, a UAV such as a micro air vehicle (MAV) may encounter both large and small obstacles that may be fixed or moving, and whose position is not known in advance. There remains a need for improved autonomous vehicle navigation systems that can respond to varied and unknown obstacles in cluttered navigational environments.

SUMMARY

An autonomous vehicle is improved with a navigational system having both cameras and echolocation sensors, each including overlapping fields of view. The cameras and echolocation sensors may be part of an optical system and echolocation system, respectively, that may work in conjunction with a global positioning system (GPS) to determine a course for the autonomous vehicle to reach an objective while detecting and avoiding obstacles along the course.

In one aspect, a navigational system for a vehicle includes a housing and an optical system having a number of cameras mounted within the housing. The cameras may have a predetermined overlap in fields of view, and the optical system may aggregate at least one hundred and eighty degrees of optical field of view about the housing in a plane through the housing. The navigational system for the vehicle may further include an echolocation system having an array of echolocation sensors mounted within the housing. The echolocation sensors may have a second predetermined overlap in fields of view, and the echolocation system may aggregate at least ten degrees of acoustic field of view about the housing in a plane through the housing.

In another aspect, a method for navigating a vehicle from a position to an objective includes: determining the position with a global positioning system, determining a course from the position to the objective, detecting a first obstacle using one or more cameras, calculating a revised course to the objective that avoids the obstacle, detecting a second obstacle using an array of echolocation sensors, and calculating a dodging maneuver that avoids the second obstacle and returns to the revised course.

In yet another aspect, a computer program product embodied in a computer-readable medium that, when executing on one or more computing devices, navigates a vehicle from a position to an objective by performing the steps of: determining the position with a global positioning system, determining a course from the position to the objective, detecting a first obstacle using one or more cameras, calculating a revised course to the objective that avoids the obstacle, detecting a second obstacle using an array of echolocation sensors, and calculating a dodging maneuver that avoids the second obstacle and returns to the revised course.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead being placed upon illustrating the principles of the devices, systems, and methods described herein.

DETAILED DESCRIPTION

Described herein are devices, systems, and methods for autonomous vehicle navigation and, in particular, for navigation using multiple modes of obstacle avoidance.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments.

No language in the specification should be construed as indicating any unclaimed element as essential to the practice of the embodiments.

In the following description, it is understood that terms such as "first," "second," "top," "bottom," "side," "front," "back," and the like are words of convenience and are not to be construed as limiting terms.

Figure 1:
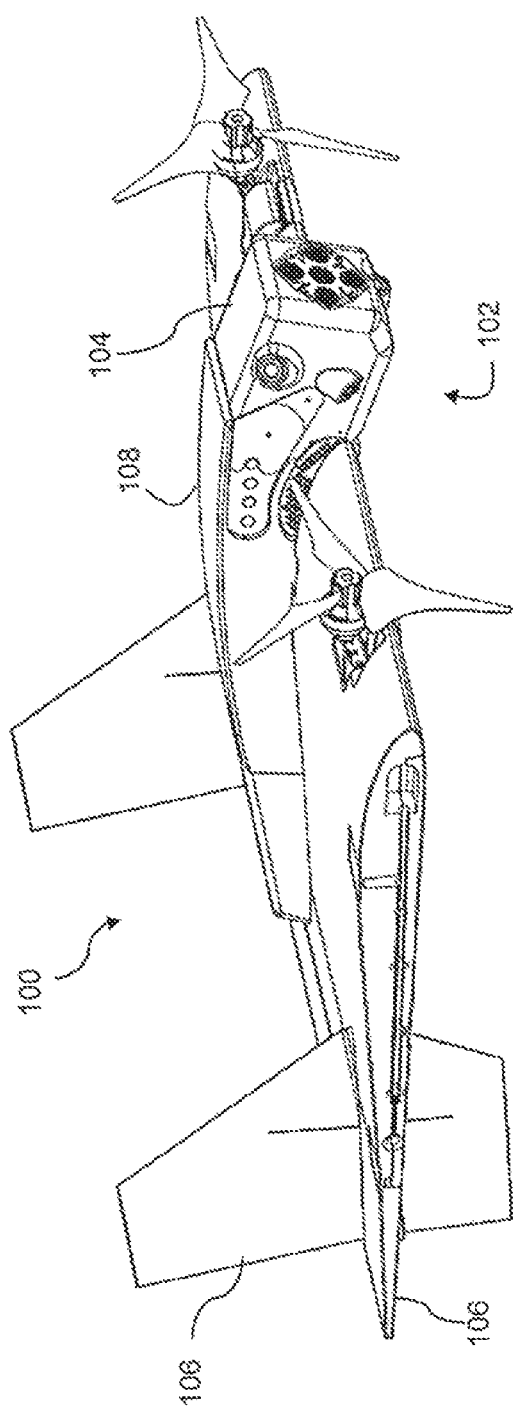
FIG. 1 shows an autonomous vehicle.

FIG. 1 shows a perspective view of an autonomous vehicle. Specifically, a vehicle 100 may include a navigation module 102, a housing 104, and a steering mechanism 106.

While the vehicle 100 depicted in FIG. 1 is an aerial vehicle, it will be understood that the autonomous vehicles described herein may include any vehicle, device, component, element, etc., that may be usefully navigated using the principles of the invention disclosed herein, including without limitation any unmanned vehicle, manned vehicle, aerial vehicle, ground vehicle, aquatic vehicle, space vehicle, remote-controlled vehicle, large vehicle, small vehicle, and so on, unless explicitly stated otherwise or clear from the text. The autonomous vehicles described herein may also or instead include vertical-takeoff-and-landing (VTOL) aircraft with forward flight capability. For example, the autonomous vehicles described herein may include helicopters or other vehicles using horizontal propellers for lift, and so forth.

The navigation module 102 generally operates to navigate the vehicle 100. In general, this "module" is a conceptual module rather than a physical item on the vehicle, and the navigation module 102 may be a component of a larger navigation system, or it may itself include all of the components of the navigation system. Unless explicitly stated otherwise or clear from the text, any components described with reference to the navigation system may also be used by or included in the navigation module 102 and vice versa.

The navigation module 102 may determine a navigational path for the vehicle 100 to reach a desired location based upon signals received from the components of the navigation system. The navigation module 102 may send signals to the steering mechanism 106 to direct the vehicle 100 along a navigational path to the desired location. The navigation module 102 may be disposed wholly or partially inside the housing 104, inside the fuselage 108, or some combination of these. The navigation module 102 may include any of the components of the housing or navigation system described, for example, with reference to FIG. 5 below. The navigation module 102 may be coupled in a communicating relationship with the vehicle 100 and a remote location, and may be configured to send and receive signals to and from the vehicle 100 and the remote location.

The housing 104 may be removable from and replaceable to the fuselage 108 and may house any systems or subsystems of a navigation system as contemplated herein. In particular, the housing 104 may contain optical sensors and echolocation sensors for augmented navigation as contemplated herein, housed in a removable package that can be removed from and replaced to the vehicle 100 for convenient reuse. Functionality may be distributed in any suitable manner between components in the housing 104 and components elsewhere in the vehicle 100, and a suitable electronic, mechanical, and communication interface may be provided to facilitate removal and replacement of the housing to the fuselage 108.

The steering mechanism 106 may include rudders at the rear of the vehicle 100, as well as elevators and any other suitable control surfaces for vertical flight vehicles, along with associated cables, actuators, and so forth. The steering mechanism 106 may also or instead include any mechanism for steering an autonomous vehicle. For example, for aerial vehicles, the steering mechanism 106 may more generally include rudders, elevators, flaps, ailerons, spoilers, air brakes, and other control surfaces. For other aerial vehicles, such as a helicopter, the steering mechanism 106 may include a number of rotors, which may be fixed rotors or steerable rotors, along with foils and other control surfaces. The steering mechanism 106 may also include articulated electric motors employing vectored-thrust control to directly change the thrust vector. For land-based vehicles, the steering mechanism 106 may include a rack and pinion system, variably rotatable treads, a recirculating ball system, and the like. The steering mechanism 106 may also or instead include any components to provide thrust, acceleration, and deceleration of the vehicle 100, along with directional control. While vehicles may generally use separate or integrated components for drive and direction, all such combinations that facilitate control over movement of a vehicle are intended to fall within the scope of a "steering mechanism" as contemplated herein.

Figure 2:
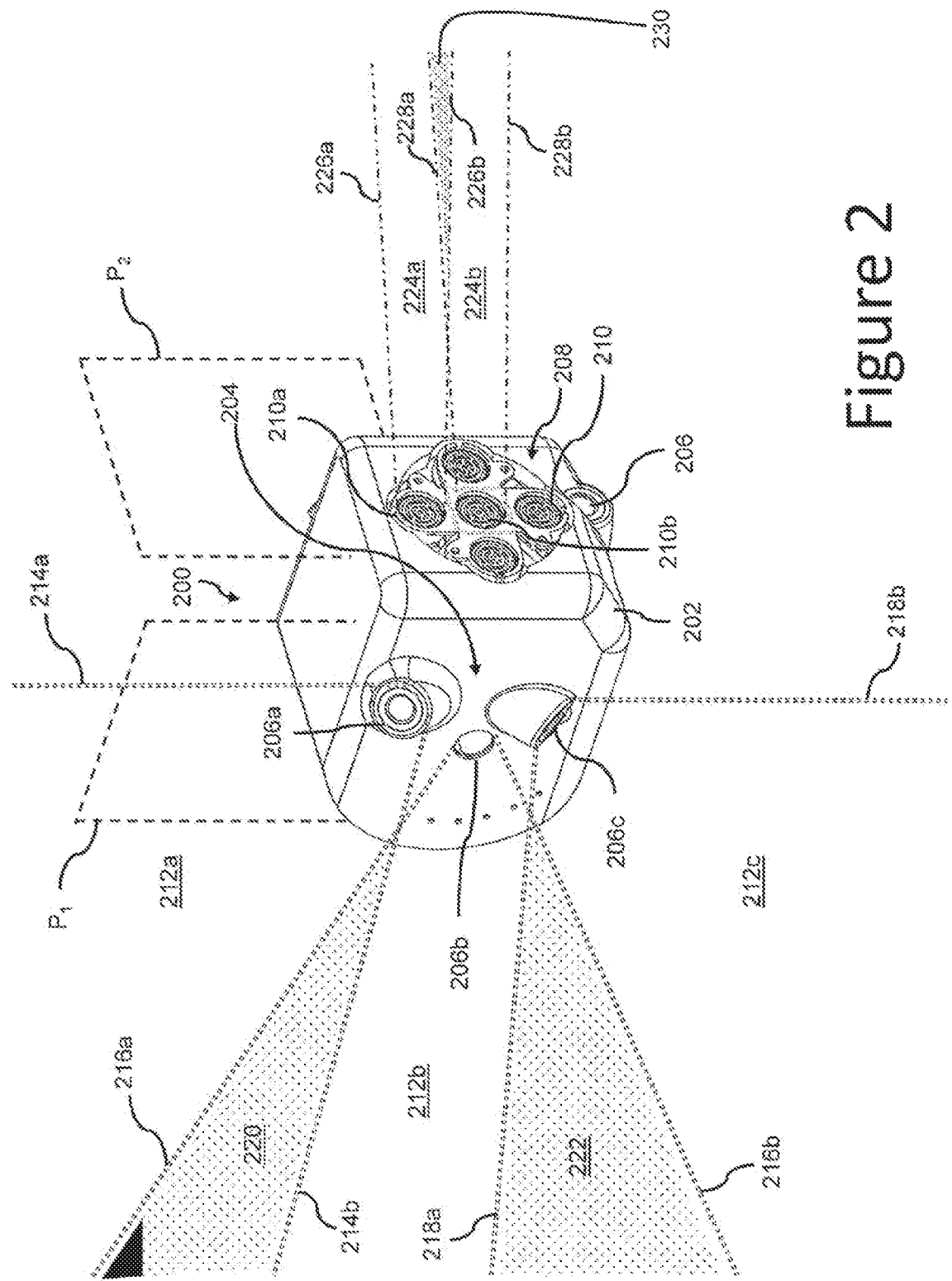
FIG. 2 shows a navigation module.

FIG. 2 shows a perspective view of a navigation module 200 that may be used in a navigation system as contemplated herein. The navigation module 200 may include a modular housing 202, an optical system 204 including cameras 206, and an echolocation system 208 including echolocation sensors 210. The navigation module 200 may attach to the exterior of a vehicle, or the navigation module 200 may be disposed wholly or partially within the vehicle. The navigation module 200 may be a removable and replaceable module that is removable from and replaceable to the vehicle, or the navigation module 200 may be permanently coupled to or integrated into the vehicle. The navigation module 200 may be used as part of the navigation system contemplated herein in order to determine a navigational path for the vehicle.

The navigational path of the vehicle may be determined based upon sensor data sensed by components of the navigation module 200. For example, the navigation module 200 may send signals based on sensed data to the navigation system, which then may send signals to a steering system to direct the vehicle along the navigational path. In general, the navigation module 200 may include all of the components of the navigation system, or the navigation module 200 may itself be a component of the navigation system. Thus, the navigation module 200 may be modular at any suitable level for a particular implementation.

The modular housing 202 may encase the components of the navigation module 200. The modular housing 202 may be constructed of plastic, metal, wood, a composite material, ceramic, or any material suitable for the purposes of a particular vehicle or type of vehicle. The modular housing 202 may be detachable or ejectable, or it may be permanently coupled to the vehicle. The modular housing 202 may be attached to the vehicle in any manner known to one of ordinary skill in the art. The modular housing 202 may include openings for sensors such as the cameras 206 and echolocation sensors 210.

The optical system 204 may include optical sensors such as cameras 206. This may include digital still cameras, video cameras, multi-lens cameras, or any other optical sensors capable of capturing images at a frame rate and a resolution suitable for use in the systems and methods contemplated herein. The optical system 204 may use the optical sensors to capture images of a context within a field of view (FOV) of the optical sensors. The optical system 204 may then process these images to identify obstructions using, e.g., optical flow, or forward the images to another processor for handling. The optical system 204 may send the images and/or other raw or processed sensor data from the optical sensors to a component of the navigation system, e.g., a processor, which then may determine a navigational path for the vehicle based on this data.

The cameras 206 may include any number of cameras such as a first camera 206a, a second camera 206b, and a third camera 206c. The FOV for the first camera 206a, the first FOV 212a, is shown as the region between dashed double-lines 214a and 214b; the FOV for the second camera 206b, the second FOV 212b, is shown as the region between dashed double-lines 216a and 216b; and the FOV for the third camera 206c, the third FOV 212c, is shown as the region between dashed double-lines 218a and 218b. As shown by the first shaded area 220, the FOVs for the first camera 206a and the second camera 206b overlap (i.e., the first FOV 212a and the second FOV 212b overlap). As shown by the second shaded area 222, the FOVs for the second camera 206b and the third camera 206c overlap (i.e., the second FOV 212b and the third FOV 212c overlap). The aggregate FOV for the first, second, and third cameras 206a, 206b, 206c is between dashed double-lines 214a and 218b, which includes the first FOV 212a, the second FOV 212b, and the third FOV 212c (including the first and second shaded areas 220 and 222, where the FOVs overlap). In this manner an aggregated field of view may be provided with any desired horizontal and vertical range (or azimuth and altitude in a spherical coordinate system) such as ninety degrees, one hundred and twenty degrees, one hundred and eighty degrees, or three hundred and sixty degrees. As shown in FIG. 2, the optical system 204 may aggregate at least one-hundred and eighty degrees of optical FOV about the modular housing 202 in a plane $P_1$ through the modular housing 202. There may be any desired, predetermined overlap in the optical FOV among the optical sensors, and any desired aggregated field of view for the combined sensor. One of ordinary skill will recognize that with more cameras having overlapping FOVs, or improved cameras with larger FOVs, more aggregate optical FOV is possible. For example, in an implementation, the optical system aggregates three hundred and sixty degrees of optical FOV in a plane through the housing. Similarly, less aggregate optical FOV is also possible. Additionally, one of ordinary skill will recognize that the cameras and optical FOVs shown are only an example of systems that are possible using the techniques described herein, and many implementations with different configurations are possible.

The echolocation system 208 may include acoustic transceivers such as echolocation sensors 210 that are operable to output acoustic signals and detect echoes of those acoustic signals. While a single echolocation sensor may provide line-of-sight object detection, an array of such sensors may be advantageously configured to obtain more robust three-dimensional detection through beam forming and similar techniques. The echolocation system 208 may use the echolocation sensors 210 to sense obstructions and obstacles within an acoustic FOV formed by the array. The echolocation system 208 may then send sensor data from its sensors to a component of the navigation system, e.g., a processor, which then may determine a navigational path for the vehicle based on this data. The echolocation system 208 may provide processed data such as data characterizing a shape, size, distance, and movement of an obstacle or the echolocation system 208 may provide a simple alert based on a detected obstruction, or some combination of these. Alternatively, the echolocation system 208 may itself include components to interpret the sensor data and create a navigational path such as a collision avoidance maneuver for the vehicle based on detected obstacles. The echolocation system 208 may cooperate with the optical system 204 to augment contextual data for the navigation system, or to provide a different mode of obstacle sensing independent from the optical system 204.

The echolocation sensors 210 may include a first sensor 210a and a second sensor 210b. The acoustic FOV for the first sensor 210a, the first acoustic FOV 224a, is shown as the region between dot-dashed lines 226a and 226b. The acoustic FOV for the second sensor 210b, the second acoustic FOV 224b, is shown as the region between dot-dashed lines 228a and 228b. As shown in FIG. 2, the first acoustic FOV 224a and the second acoustic FOV 224b overlap at a third shaded area 230. Thus, an aggregate acoustic FOV for sensors 210a and 210b is between dot-dashed lines 226a and 228b, which includes the first acoustic FOV 224a and the second acoustic FOV 224b (including the overlap indicated by the third shaded area 230). In an implementation, the echolocation system 208 aggregates at least ten degrees of acoustic FOV about the modular housing 202 in a plane $P_2$ through the modular housing 202. One of ordinary skill will recognize that with more echolocation sensors having overlapping acoustic FOVs, or improved sensors with larger FOVs; more aggregate acoustic FOV is possible. For example, in an implementation, the echolocation system aggregates at least twenty degrees of acoustic FOV in a plane through the housing. In another implementation, the echolocation system aggregates between ten and forty-five degrees of acoustic FOV in a plane through the housing. Similarly, less aggregate acoustic FOV is possible. Additionally, one of ordinary skill will recognize that the echolocation sensors and acoustic FOVs shown are only an example of systems that are possible using the techniques described herein, and many implementations with different configurations are possible.

The echolocation sensors 210 may include any echolocation sensor known in the art or that will become known in the art, including without limitation ultrasonic sensors and the like. In one aspect, the cameras 206 may be used to identify larger objects through three-dimensional reconstruction techniques such as optical flow. While this may provide useful information for autonomous navigation, the processing latency associated with optical imaging, as well as sensitivity to the visibility of various types of objects, may limit the utility of optical sensing techniques for detecting small, rapidly approaching objects in a line of flight of a vehicle. By orienting the echolocation sensors 210 toward the line of flight, acoustic detection may supplement optical detection and be used for detecting immediate obstructions that should trigger the execution of dodging maneuvers by a vehicle.

It will be appreciated that one purpose of the echolocation sensors 210 is to provide immediate detection of obstacles directly in a flight path (or other line of travel), particularly obstacles that might not be detected using visual detection or other techniques. While an echolocation array operates well in this context, other sensor systems may also or instead be suitably employed for rapid, accurate detection of obstacles in a line of travel, including without limitation laser-based techniques or any other suitable techniques using optical, acoustic, radio frequency, or other sensing modalities. Any such technique suitable for implementation in an autonomous vehicle and capable of accurately and quickly identifying obstructions may be used in place of the echolocation system in the systems and methods contemplated herein.

Figure 3:
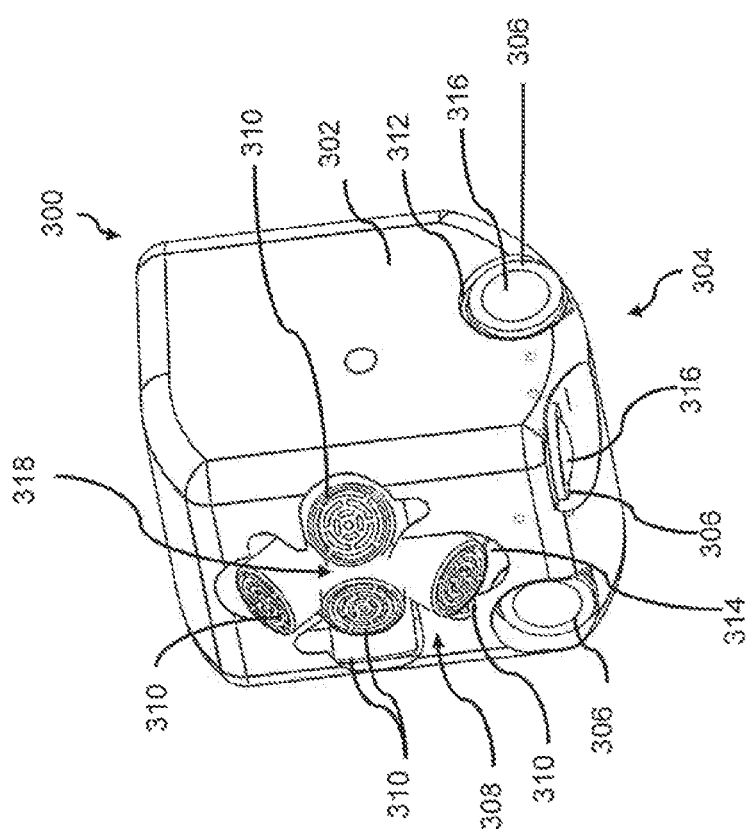
FIG. 3 shows a navigation module

FIG. 3 shows a perspective view of a navigation module 300. The navigation module 300 may include a modular housing 302, an optical system 304 including cameras 306, and an echolocation system 308 including echolocation sensors 310. The modular housing 302 may encase the components of the navigation module 300 and provide openings 312, 314 for the sensors included in the navigation module 300, e.g., the cameras 306 and echolocation sensors 310. The opening 312 for the cameras 306 may include an aperture that allows the lens 316 of a camera to be substantially unobstructed by the modular housing 302. The camera 306 may slightly protrude from the modular housing 302, or it may be recessed within the modular housing 302. The opening 314 for the echolocation sensors allows for a plurality of echolocation sensors 310 to extend from the housing 304 of the navigation module 300 at varying angles. This configuration may allow for a greater acoustic FOV in the aggregate. The plurality of echolocation sensors 310 may be joined together in an echolocation module 318 that integrates operation of the two or more echolocation sensors.

In one aspect, beam forming techniques or the like may be used to enhance the echolocation signal provided by the array of echolocation sensors 310, and may effectively extend the range beyond that of individual transducers or steer an aggregated field of view according to, e.g., a direction of travel of a vehicle or a direction of a detected or anticipated obstruction.

Figure 4:
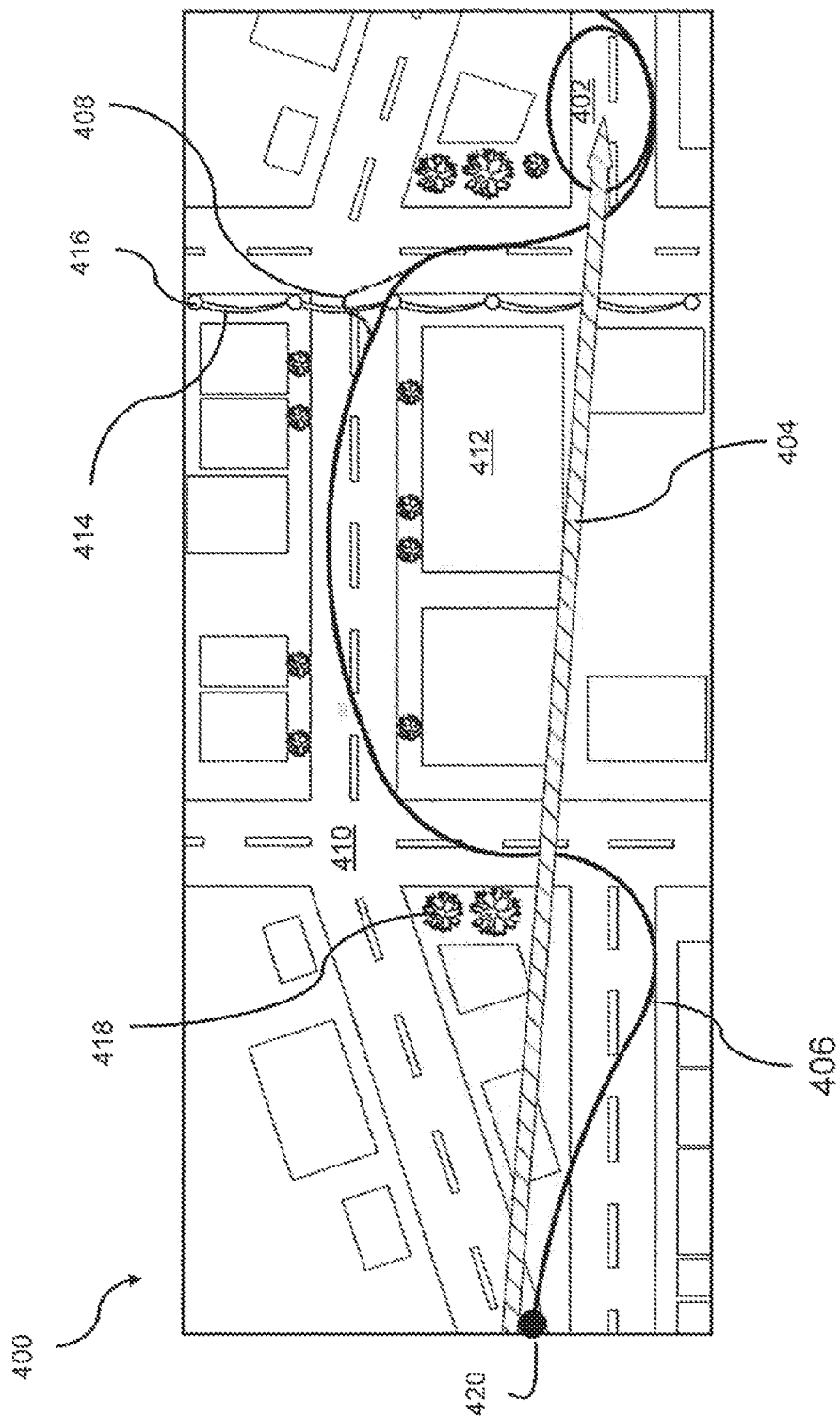
FIG. 4 shows an environment for autonomous navigation.

FIG. 4 shows an environment for autonomous navigation. The environment 400 may include an objective 402, one or more roads 410, and any number of obstacles such as buildings 412, utility lines 414, utility poles 416, and trees 418. Three navigational paths (404, 406, 408) toward the objective 402 are depicted, with each path addressing various obstacles using the systems and methods described herein.

The objective 402 may be a location, object, or person to be observed, identified, or targeted. The objective 402 may also be a landing point, rendezvous point, team member location, enemy location, observation location, or any other point of interest or the like. For example, the vehicle may be intended to fly or hover above the objective 402, e.g., to capture reconnaissance data, to land or be retrieved at the objective 402, or to drop a payload such as supplies.

The objective 402 may be located at a distance from and in a direction from a starting point 420, as described by a first path 404. The first path 404 may be a strategic, high-level mission goal characterized by, e.g., a straight line from a current location (the starting point 420) to the objective 402 using coordinates determined by GPS or any other suitable techniques. While it may be possible to traverse the first path 404 at a high elevation, this path would be unsuitable for low-level flight in an urban context or the like.

The second path 406 may be a tactical navigational path that maneuvers through clutter (i.e., buildings 412 and trees 418) to reach the objective 402. The second path 406 avoids larger obstacles such as buildings 412 by, e.g., following a known road 410 or otherwise navigating between various obstacles. In one aspect, this second path 406 may be determined by modifying the first path 404 according to a map or other digital representation of the environment 400 that provides information on obstacle locations. Thus, the second path 406 may be determined a priori based on available information before navigation is initiated. In another aspect, the second path 406 may be determined dynamically, such as by using optical flow from cameras or the like to identify obstacles and modify direction while in flight. It will be understood that other information systems for a vehicle, such as GPS, accelerometers, gyroscopes, and the like may also or instead be used to track movements and improve or update information used to create the second path 406 or monitor progress along the second path 406.

The third path 408 includes a dodging maneuver to avoid an obstacle. In general, the third path 408 may include any obstacle-avoidance maneuver that preempts other navigational inputs such as the first path 404 (which may be, e.g., GPS-based) or the second path 406 (which may be, e.g., optically-based) in response to a detected obstacle. For example, while following the second path 406, an obstacle such as the utility lines 414 may be detected by a short-range obstacle detection system such as the array of echolocation sensors described herein. In response, a local dodging maneuver may be performed that locally avoids the short-range obstacle and then returns immediately to the second path 406 (or a revised version of the second path 406 calculated after the dodging maneuver is complete). The dodging maneuver may be a predetermined maneuver such as a hard right, hard left, straight up, or straight down, or the dodging maneuver may be selected from a number of available predetermined maneuvers according to the sensed obstacle, any of which may return to a previous direction and speed or to a predetermined path after execution. In another aspect, the dodging maneuver may be dynamically determined according to data obtained by the echolocation system or other short-range sensing system.

In operation, an autonomous vehicle starting at the starting point 420 and programmed to reach the objective 402 would travel along the first path 404 if there were no obstructions along this path. If there were visually detectable obstacles such as buildings 412 or trees 418, the autonomous vehicle would calculate a new path (the second path 406) and travel along this revised route in order to avoid the visually detected obstacles. If there are additional obstacles detected by an echolocation sensor array or other short-range sensing system (such as the utility lines 414 and utility poles 416), the autonomous vehicle may execute a dodging maneuver and follow the third path 408 in order to avoid these additional obstacles.

In operation, these various techniques may be hierarchically arranged to preempt one another at appropriate times. Thus, for example, a vehicle may optically detect various obstacles such as buildings, and preempt a GPS-based navigational plan in order to avoid these obstacles. During this recalculated route, a short-range obstacle may be detected by a forward-facing array of echolocation sensors. A dodging maneuver based on this detected obstacle may preempt other navigational instructions until the short-range obstacle has been avoided.

In one aspect, the second path 406 may be viewed as a semi-localized path. That is, the second path 406 may be selected to reach the objective 402, but preempts the first path 404—the direct path—to account for intervening obstacles and provides an indirect route to the objective 402 that avoids such obstacles. By contrast, the third path 408 is a fully localized path that serves only to locally avoid a collision with an object, preferably returning immediately to the second path 406. The third path 408 generally does not take into account the objective 402, but is instead locally executed based exclusively on an obstacle in the line of travel. After completing a collision avoidance maneuver, it may be necessary to recalculate the second path 406, particularly where the third path 408 does not return to the second path 406, either intentionally or unintentionally.

Figure 5:
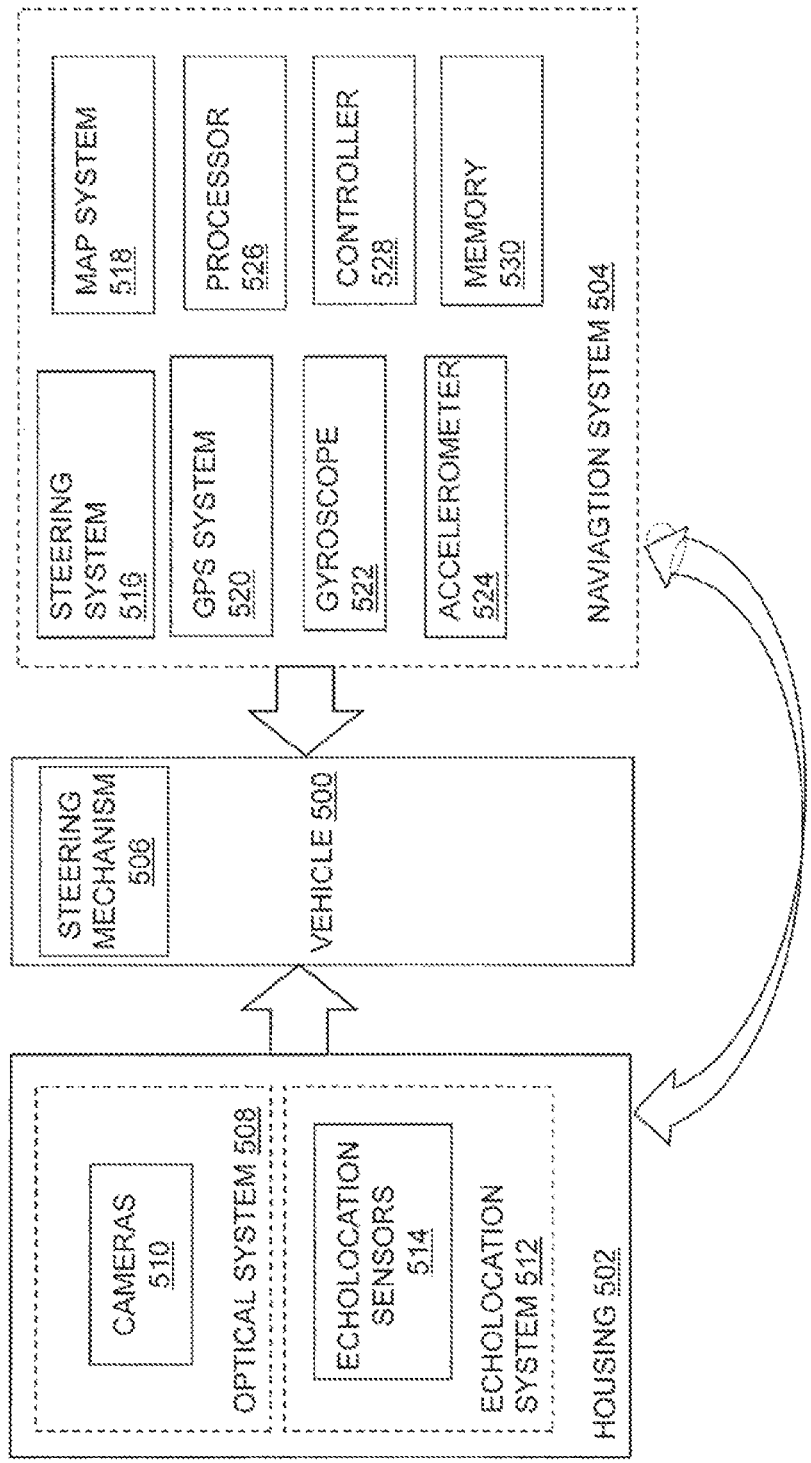
FIG. 5 is a block diagram of a navigation system for an autonomous vehicle.

FIG. 5 is a block diagram of an autonomous vehicle 500 with a housing 502 and a navigation system 504. It will be understood that the arrangement of components may vary. For example, the navigation system 504 may be located within the housing 502 and removable from the vehicle 500, or the navigation system 504 may be integrated into the vehicle 500 and coupled in a communicating relationship with the optical system 508 and echolocation sensors 514 of the housing 502. Similarly, the housing 502 may be removably coupled to the vehicle 500 or integrated into a fuselage or the like of the vehicle 500 in any desired manner.

The autonomous vehicle 500 may include a steering mechanism 506, which may be configured to steer the vehicle 500 on a navigational path to reach an objective as contemplated herein. The autonomous vehicle 500 may be any vehicle referenced herein or otherwise known in the art (or will be known in the art). Similarly, the steering mechanism 506 may be any form of steering referenced herein or otherwise known in the art (or will be known in the art). In general, the steering mechanism 506 responds to signals from the navigation system 504, which may employ feedback or other control systems to accurately direct the vehicle 500 along an intended route.

The housing 502 may include an optical system 508 that includes cameras 510, and each camera 510 may have an optical FOV. The cameras 510 may be any of the cameras referenced herein or otherwise known in the art (or will be known in the art). The optical system 508 may in general obtain images from an environment around the housing 502 (or vehicle 500) and process the images in any suitable manner including, for example, using optical flow. In one aspect, this may yield information concerning visible obstacles around the housing 502, which can be used to revise a navigational path in any suitable manner. In another aspect, the optical flow processing may yield movement information that can be provided as feedback to a control system for steering the vehicle 500. Suitable flight control feedback systems and techniques based on, e.g., flight kinematics and dynamics are known in the art and are not described herein in detail.

The housing 502 may further include an echolocation system 512 including echolocation sensors 514, where each echolocation sensor 514 may have an acoustic FOV. The echolocation sensors 514 may be any of the echolocation sensors referenced herein or otherwise known in the art (or will be known in the art). The echolocation system 512 may in particular be useful for detecting small obstacles appearing in a direction of travel of the vehicle 500. By independently processing data from the echolocation system 512, a preemptive obstacle avoidance system may be provided that temporarily interrupts other navigational systems to immediately execute a collision avoidance maneuver at appropriate times. As noted above, any other system or modality for detecting obstacles in a path of travel of the vehicle 500 may also or instead be employed.

In general, the components of the housing 502 (e.g., the optical system 508 and the echolocation system 512) may communicate with the navigation system 504 in order to provide, e.g., sensed data from the cameras 510 and the echolocation sensors 514. A variety of physical configurations are possible, and the housing 502 may also or instead include any components of the navigation system 504 described below.

In general, the navigation system 504 may include a steering system 516, a map system 518, a global positioning system (GPS) 520, a gyroscope 522, an accelerometer 524, a processor 526, a controller 528, and a memory 530. The navigation system 504 may also include the components described above as being disposed within the housing 502, as well as any other conventional flight instrumentation, sensors, processing circuitry, communications circuitry, and the like necessary or useful for operation of an unmanned aerial vehicle or other autonomous or manually piloted vehicle.

The steering system 516 may be configured to receive signals from the navigation system 504 and provide suitable control signals to the steering mechanism 506 of the vehicle in order to direct the vehicle 500 along an intended route.

The map system 518 may be part of a map-based navigation system that provides positional information about natural and manmade features within an area. This may include information at any level of detail including, e.g., topographical maps, general two-dimensional maps identifying roads, buildings, rivers, and the like, or detailed three-dimensional data characterizing height and shape of various natural and manmade obstructions such as trees, sculptures, utility infrastructure, buildings, and so forth. In one aspect, the map system 518 may cooperate with the optical system 508 for visual verification of surrounding context, or the map system 518 may cooperate with the GPS system 520 to provide information on various obstacles within an environment for purposes of path determination or the like. In one aspect, the map system 518 may provide a supplemental navigational aid in a GPS-denied or GPS-impaired environment. When GPS is partially or wholly absent, the map system 518 may cooperate with optical sensors, inertial sensors, and so forth to provide positional information until a GPS signal can be recovered.

The map system 518 may more generally communicate with other components of the navigation system 504 in order to support navigation of a vehicle as contemplated herein. While this may include providing map information for calculation of routes, this may also include independent navigational capabilities. For example, the map system 518 may provide a map-based navigation system that stores a map of an operating environment including one or more objects. The map-based navigation system may be coupled to cameras and configured to determine a position of a vehicle by comparing stored objects to a visible environment, which may provide position data in the absence of GPS data or other positional information.

The GPS system 520 may be part of a global positioning system configured to determine a position of the housing 504 or the autonomous vehicle 500. The GPS system 520 may include any GPS technology known in the art or that will become known in the art including conventional satellite-based systems as well as other systems using public or privately operated beacons, positional signals, and the like. The GPS system 520 may include one or more transceivers that detect data for use in calculating a location. The GPS system 520 may cooperate with the other components of the navigation system 504 to control operation of the vehicle 500 and navigate the vehicle along an intended path.

The gyroscope 522 may be a device configured to detect rotation of the housing 502 or the autonomous vehicle 500 to which the housing 502 is coupled. The gyroscope 522 may be integral with the autonomous vehicle 500, or it may be disposed inside or outside of the housing 502. The gyroscope 522 may include any gyroscope or variations thereof (e.g., gyrostat, MEMS, FOG, VSG, DTG, and the like) known in the art or that will become known in the art. The gyroscope 522 may cooperate with the other components of the navigation system 504 to control operation of the vehicle 500 and navigate the vehicle along an intended path.

The accelerometer 524 may be any device configured to detect a linear motion of the housing 502 or the autonomous vehicle 500. The accelerometer 524 may be integral with the autonomous vehicle 500, or it may be disposed inside or outside of the housing 502. The accelerometer 524 may include any accelerometer known in the art (e.g., capacitive, resistive, spring mass base, DC response, electromechanical servo, laser, magnetic induction, piezoelectric, optical, low frequency, PIGA, resonance, strain gauge, SAW, MEMS, thermal, vacuum diode, and the like) or that will become known in the art. The accelerometer 524 may cooperate with the other components of the navigation system 504 to control operation of the vehicle 500 and navigate the vehicle along an intended path.

Other sensors and sensor systems may also or instead be included. For example, the vehicle 500 (or the navigation system 504 or housing 502 of the vehicle) may include infrared sensors, RADAR sensors, LIDAR sensors, and so forth, any of which may be used alone or in combination with other systems and sensors described herein to augment vehicle navigation.

The processor 526 may be coupled in a communicating relationship with the controller 528, the autonomous vehicle 500, the navigation system 504, the steering mechanism 506, and the other various components, systems, and subsystems described herein. The processor 526 may be an internal processor of the autonomous vehicle 500 or the navigation system 504, an additional processor within the housing 502 to support the various navigational functions contemplated herein, a processor of a desktop computer or the like locally or remotely coupled to the autonomous vehicle 500 and the navigation system 504, a server or other processor coupled to the autonomous vehicle 500 and the navigation system 504 through a data network, or any other processor or processing circuitry. In general, the processor 526 may be configured to control operation of the autonomous vehicle 500 or the navigation system 504 and perform various processing and calculation functions to support navigation. The processor 526 may include a number of different processors cooperating to perform the steps described herein, such as where an internal processor of the autonomous vehicle 500 controls operation of the autonomous vehicle 500 while a processor in the housing pre-processes optical and echolocation data.

The processor 526 may be configured to determine or revise a navigational path for the autonomous vehicle 500 to a location based upon a variety of inputs including, e.g., position information, movement information, and so forth, which may be variously based on data from the GPS system 520, the map system 518, the gyroscope 522, the accelerometer 524, and any other navigation inputs, as well as the optical system 508 and the echolocation system 512, which may provide information on obstacles in an environment around the vehicle 500. An initial path may be determined, for example, based solely on positional information provided by the GPS system 520, with in-flight adjustments based on movements detected by the gyroscope 522, accelerometer 524, and the like. The processor 526 may also be configured to utilize an optical navigation system, where the processor is configured to identify a visible obstacle within the FOV of the optical system 508, for example, using optical flow to process a sequence of images, and to preempt the GPS system 520 to navigate the autonomous vehicle 500 around the visible obstacle and toward the location. The processor 526 may be further configured to identify an obstacle within the FOV of the echolocation system 512, usually within a line of flight of the vehicle, and further configured to preempt the GPS system 520 and the optical navigation system to execute a dodging maneuver that directs the autonomous vehicle 500 around the obstacle and returns the autonomous vehicle 500 to a previous course toward the location.

The controller 528 may be operable to control components of the autonomous vehicle 500 and the navigation system 504, such as the steering mechanism 506. The controller 528 may be electrically or otherwise coupled in a communicating relationship with the processor 526, the autonomous vehicle 500, the navigation system 504, the steering mechanism 506, and the other various components of the devices and systems described herein. The controller 528 may include any combination of software and/or processing circuitry suitable for controlling the various components of the autonomous vehicle 500 and the navigation system 504 described herein, including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. In one aspect, this may include circuitry directly and physically associated with the autonomous vehicle 500 and the navigation system 504 such as an on-board processor. In another aspect, this may be a processor, such as the processor 526 described herein, which may be associated with a personal computer or other computing device coupled to the autonomous vehicle 500 and the navigation system 504, e.g., through a wired or wireless connection. Similarly, various functions described herein may be allocated between an on-board processor for the autonomous vehicle 500 and the navigation system 504 and a separate computer. All such computing devices and environments are intended to fall within the meaning of the term "controller" or "processor" as used herein, unless a different meaning is explicitly provided or otherwise clear from the context.

The memory 530 may include local memory or a remote storage device that stores a log of data for the navigation system 504 including without limitation the location of sensed obstacles, maps, images, orientations, speeds, navigational paths, steering specifications, GPS coordinates, sensor readings, and the like. The memory 530 may also or instead store a log of data aggregated from a number of navigations of a particular vehicle, or data aggregated from a number of navigations of different vehicles. The memory 530 may also or instead store sensor data from the optical system 508 and echolocation system 512, related metadata, and the like. Data stored in the memory 530 may be accessed by the processor 526, the controller 528, a remote processing resource, and the like.

Figure 6:
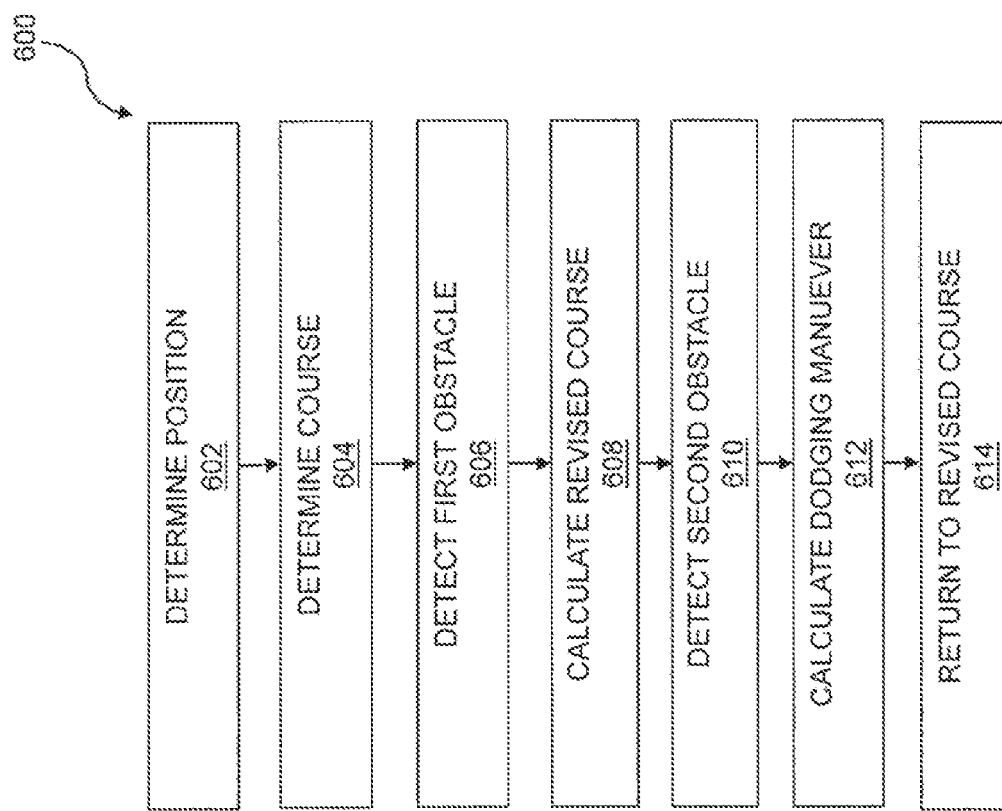
FIG. 6 is a flow chart of a method for navigating a vehicle from a position to an objective.

FIG. 6 is a flow chart of a method 600 for navigating a vehicle from a position to an objective.

As shown in step 602, the method 600 may include determining the position with a global positioning system (GPS). This may be any military, civil, or commercial space-based satellite navigation system, or any other proprietary positioning system that provides signals from a number of space-based and/or terrestrial beacons that can be processed to determine a location. More generally, determining the position may include determining the position based on data from a variety of sources including without limitation the GPS system, a map system and various sensors, any of which may be used alternately or in combination according to, e.g., accuracy, availability, and any other suitable criteria. Determining the position of the vehicle may also include determining the position based on sensor data such as data from the optical system and the echolocation system described above.

While GPS generally provides accurate positional information, in certain circumstances it may be necessary or helpful to determine position based on data from other sources. For example, very rapid movements may be detected by an accelerometer or gyroscope and used to update a position before a new GPS-based position can be calculated. As another example, a vehicle may enter a GPS-denied or GPS-impaired environment where position is calculated based on other data until a GPS signal is recovered. For example, a position may be determined based upon a previous position from the GPS system and a source of movement information when position data is not available from the GPS system. Movement information may be based on an analysis of image data from the optical system (e.g., one or more cameras), data from the gyroscope, data from the accelerometer, data from the echolocation system (e.g., one or more echolocation sensors), and the like.

As shown in step 604, the method 600 may include determining a course from the position to the objective. Initially, the course may be a straight line from the position detected above to an objective. However, as the position changes during navigation, determining the course may include using the various systems described herein including without limitation the GPS system and the map system. Determining the course may also include using sensor data, for example, from the various systems described herein including without limitation the optical system and the echolocation system. Determining the course may also include the use of the processor, controller, and memory. Determining the course may also be based upon a previous position from the GPS system and a source of movement information when position data is not available from the GPS system. The methods described herein may also include navigating the vehicle to follow the course. This navigation may utilize any of the components of the devices and systems described herein. The position may be a position determined with GPS as described above. Additionally or alternatively, the position may be any other position of the vehicle including without limitation a past position, present position, future position, ideal position, and the like. The objective may be any point of interest for the vehicle.

As shown in step 606, the method 600 may include detecting a first obstacle using one or more cameras. Step 606 may include gathering image data from an environment and processing the image data to identify a first obstacle and determine a location, size, and other information as appropriate. In general, this may be any visible obstacle capable of detection through optical flow that blocks, partially blocks, obscures, endangers, etc., the navigational path of the vehicle from the position to the objective. The first obstacle may be any visible physical obstacle such as a building, a tree, a power line, a rock, and so forth. Where map data or the like is also available, the first obstacle may include other non-physical obstacles such as a radar detection site, a radiation zone, a sightline of a person or sensor, and so forth. More generally, the first obstacle may be any location or path that the vehicle should avoid.

As shown in step 608, the method 600 may include calculating a revised course to the objective that avoids the obstacle. Calculating the revised course may include the use of the various systems described herein including without limitation the GPS system and the map system. Calculating the revised course may also include using sensor data, for example, from the various systems described herein including without limitation the optical system and the echolocation system. Calculating the revised course may also use a current position that is determined based upon a previous position from the GPS system and a source of movement information when position data is not available from the GPS system. Once the revised course is determined, this may include navigating the vehicle with suitable signals to a steering system to follow the revised course.

As shown in step 610, the method 600 may include detecting a second obstacle using an array of echolocation sensors, such as the echolocation system described above. This may include monitoring data from the array of echolocation sensors and interpreting the data to identify the second obstacle. This result—identification of the second obstacle—may include descriptive data concerning a size or location of the second obstacle, or simply a signal that an obstacle lies in the immediate path of the vehicle.

As shown in step 612, the method 600 may include calculating a dodging maneuver that avoids the second obstacle. In one aspect, the dodging maneuver may be a predetermined dodging maneuver that provides a temporary excursion from the revised course and returns immediately to the revised course after the dodging maneuver has been executed. In another aspect, this may include selecting from among a number of predetermined dodging maneuvers according to information about the obstacle, or dynamically creating a dodging maneuver according to feedback from the echolocation system. Where appropriate, the dodging maneuver may be further adapted to other data such as GPS data, optical data, or other sensor data in order to better respond to the context of the detected obstacle. However calculated, instructions for the dodging maneuver may be transmitted to a steering system for the vehicle for corresponding execution.

As shown in step 614, the method 600 may include returning to the revised course. Where the dodging maneuver successfully returns to a point along the prior course, navigation may resume based on the revised course. Where the dodging maneuver leaves the vehicle in a new position off the prior course, a new course may be calculated as the revised course for execution by the steering system. In order to return to the revised course, or a new revised course, other data such as GPS data, map data, optical data, or other sensor data may also be used as appropriate to determine a current location or to provide a recalculated route to the objective.

The autonomous vehicle navigation systems described herein may also include client devices, which may include any devices operated by users to initiate, manage, monitor, control, or otherwise interact with the navigation system or autonomous vehicle. This may include desktop computers, laptop computers, network computers, tablet computers, or any other computing device that can participate in the systems as contemplated herein. The client devices may include a user interface, which may include a graphical user interface, a text or command line interface, a voice-controlled interface, and/or a gesture-based interface to control operation of the navigation system or autonomous vehicle. The user interface may be maintained by a locally executing application on one of the client devices that receives data and status information from, e.g., the navigation system or autonomous vehicle. The user interface may create a suitable display on the client device for user interaction. For example, the user interface may include a display that shows the user views from the cameras in the optical system or displays other data from other sensors within the navigation system. In other embodiments, the user interface may be remotely served and presented on one of the client devices, such as where the navigation system or autonomous vehicle includes a web server that provides information through one or more web pages or the like that can be displayed within a web browser or similar client executing on one of the client devices. In one aspect, the user interface may include a voice-controlled interface that receives spoken commands from a user and/or provides spoken feedback to the user.

While the autonomous vehicle navigation system described herein is generally described as using echolocation sensors, one of skill in the art would recognize that other sensors are possible. For example, the autonomous vehicle navigation system may employ sensors including those employing electroacoustic, optical, radar, laser-based techniques, automatic, dependent surveillance-broadcast ("ADS-B") (e.g., an ADS-B receiver), and/or any other suitable techniques using optical, acoustic, radio frequency, or other sensing modalities.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors, or other programmable devices or processing circuitry, along with internal and/or external memory. This may also, or instead, include one or more application-specific integrated circuits, programmable gate arrays, programmable array logic components, or any other device or devices that may be configured to process electronic signals. It will further be appreciated that a realization of the processes or devices described above may include computer-executable code created using a structured programming language such as C, an object-oriented programming language such as C++, or any other high-level or low-level programming language (including assembly languages, hardware description languages, and database programming languages and technologies) that may be stored, compiled, or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any or all of the steps of the control systems described above. The code may be stored in a non-transitory fashion in a computer memory, which may be a memory from which the program executes (such as random access memory associated with a processor), or a storage device such as a disk drive, flash memory, or any other optical, electromagnetic, magnetic, infrared, or other device or combination of devices. In another aspect, any of the systems and methods described above may be embodied in any suitable transmission or propagation medium carrying computer-executable code or any inputs or outputs from same.

The method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An aerial vehicle comprising:
   an acoustic system coupled to the aerial vehicle and configured to provide a plurality of acoustic fields of view via a plurality of acoustic transceivers that are oriented toward a direction of travel of the aerial vehicle, wherein the acoustic system is configured to employ a beamforming technique and to aggregate at least a portion of the plurality of acoustic fields of view to acoustically identify obstacles;
   a processor operatively coupled to the acoustic system, wherein, upon detection of an obstacle by the acoustic system, the processor is configured to calculate dynamically a dodging maneuver for the aerial vehicle to avoid the obstacle; and
   a steering mechanism to steer the aerial vehicle in response to commands from the processor, wherein the steering mechanism comprises a plurality of rotors to provide lift to the aerial vehicle, wherein the steering mechanism is configured to effectuate the dodging maneuver in response to commands from the processor.

2. The aerial vehicle of claim 1, wherein the acoustic system and the processor are provided as a module that is configured to removably couple with the aerial vehicle.

3. The aerial vehicle of claim 1, further comprising an optical system coupled to the aerial vehicle and the processor, wherein the optical system is configured to provide an optical field of view about at least a portion of the aerial vehicle and to optically identify obstacles within the optical field of view.

4. The aerial vehicle of claim 3, wherein the optical system includes one or more infrared sensors.

5. The aerial vehicle of claim 3, wherein the optical system employs a plurality of cameras, each of which having a field of view, wherein the optical system is configured to aggregate images from each of said plurality of cameras.

6. The aerial vehicle of claim 5, wherein the optical system is configured to aggregate images from each of said plurality of cameras to provide three hundred and sixty degrees of optical field of view.

7. The aerial vehicle of claim 3, wherein the optical system comprises two or more cameras configured to optically identify obstacles using three-dimensional reconstruction techniques.

8. The aerial vehicle of claim 3, wherein the optical field of view overlaps at least in part with the acoustic field of view.

9. The aerial vehicle of claim 8, wherein the optical field of view encompasses the acoustic field of view.

10. The aerial vehicle of claim 3, wherein the optical system comprises a laser-based optical device.

11. The aerial vehicle of claim 3, wherein the processor is configured to use movement information as feedback to control the steering mechanism, wherein the movement information comprises speed or heading information that is generated by the processor through optical flow processing of data from the optical system.

12. The aerial vehicle of claim 1, wherein the processor is configured to determine at least a portion of a navigational path for the aerial vehicle from a first position to a second position, and wherein the processor is configured to steer the aerial vehicle along the navigational path in response to commands from the processor.

13. The aerial vehicle of claim 12, wherein the processor is configured to command the steering mechanism to effectuate the dodging maneuver to deviate from the navigational path upon detection of the obstacle.

14. The aerial vehicle of claim 13, wherein the processor is configured to command the steering mechanism to return the aerial vehicle to the navigational path upon completion of the dodging maneuver.

15. The aerial vehicle of claim 14, wherein the processor is configured to command the steering mechanism to effectuate the dodging maneuver until the obstacle is no longer detected by the acoustic system.

16. The aerial vehicle of claim 12, further comprising a geolocation system to provide a position of the aerial vehicle within an operating environment, wherein the geolocation system employs a global positioning system (GPS) transceiver to dynamically determine the first position of the aerial vehicle.

17. The aerial vehicle of claim 12, wherein the first position is an estimated position of the aerial vehicle that is based at least in part on a function of a previous position of the aerial vehicle and movement information of the aerial vehicle.

18. The aerial vehicle of claim 12, wherein the processor is configured to determine the navigational path based at least in part on environment data reflecting known obstacle locations.

19. The aerial vehicle of claim 1, wherein the dodging maneuver is a predetermined maneuver selected based at least in part on a characteristic or a position of the obstacle.

20. The aerial vehicle of claim 1, wherein the aerial vehicle is configured with a manually piloted operation, wherein the dodging maneuver from the processor preempts commands by a user from a remote user interface during the manually piloted operation.

21. The aerial vehicle of claim 20, wherein the remote user interface comprises a display device to display to the user video captured by the aerial vehicle.

22. The aerial vehicle of claim 1, wherein at least one of the plurality of acoustic transceivers is an ultrasonic sensor.

23. The aerial vehicle of claim 1, wherein the processor is configured to determine a distance between the aerial vehicle and an obstacle based at least in part on sensor data from the acoustic system.

24. The aerial vehicle of claim 1, wherein the aerial vehicle further comprises one or more RADAR or LIDAR sensors operatively coupled to the processor that are configured to detect obstacles.

25. The aerial vehicle of claim 1, wherein the processor is configured to calculate a size of the obstacle.

26. An aerial vehicle comprising:

an acoustic system coupled to the aerial vehicle to provide an acoustic field of view about at least a portion of the aerial vehicle, wherein the acoustic system is configured to employ a beamforming technique and to acoustically identify obstacles within the acoustic field of view using at least one of a first and a second acoustic transceiver configured to output an acoustic signal and to detect an echo of the acoustic signal, wherein the first acoustic transceiver has a first field of view, wherein the second acoustic transceiver has a second field of view, wherein the first field of view and the second field of view at least partially overlap, and wherein the acoustic field of view comprises the first field of view and the second field of view;

an optical system coupled to the aerial vehicle, wherein the optical system is configured to provide an optical field of view about at least a portion of the aerial vehicle and to optically identify obstacles within the optical field of view;

a processor operatively coupled to the acoustic system and the optical system, wherein, upon detection of an obstacle by the optical system or the acoustic system, the processor is configured to calculate dynamically a dodging maneuver for the aerial vehicle to avoid the obstacle; and a steering mechanism to steer the aerial vehicle in response to commands from the processor, wherein the steering mechanism is configured to effectuate the dodging maneuver in response to commands from the processor, wherein the dodging maneuver from the processor preempts other commands from the processor.

27. An aerial vehicle comprising:

an acoustic system coupled to the aerial vehicle and configured to provide an acoustic field of view to acoustically identify obstacles via one or more acoustic transceivers that are oriented toward a direction of travel of the aerial vehicle;

an optical system configured to provide an optical field of view about at least a portion of the aerial vehicle and to optically identify obstacles within the optical field of view a processor operatively coupled to the acoustic system and the optical system, and configured to generate control signals, wherein the processor is configured to generate speed or heading information through optical flow processing of data from the optical system, and wherein the processor is configured to use the speed or heading information as feedback; and a steering mechanism to steer the aerial vehicle in response to the control signals from the processor, wherein the steering mechanism comprises a plurality of rotors to provide lift to the aerial vehicle.

* * * * *